United States Patent [19]

Beer et al.

[11] Patent Number: 4,681,415
[45] Date of Patent: Jul. 21, 1987

[54] MULTIPLE IMAGE PHOTOGRAPHY SYSTEM

[76] Inventors: Rafael Beer, 207 S. Catalina #4, Los Angeles, Calif. 90004; Tyrone Christiansen, 5617 Hollywood Boulevard, No. 102, Hollywood, Calif. 90028

[21] Appl. No.: 794,944

[22] Filed: Nov. 1, 1985

[51] Int. Cl.[4] .................. G03B 1/00; G03B 15/00
[52] U.S. Cl. .............................. 354/120; 354/150
[58] Field of Search ............ 354/95, 103, 110, 120, 354/122, 150

[56] References Cited

U.S. PATENT DOCUMENTS 1,438,906 12/1922 Douglass .......................... 354/110
3,016,812 1/1962 Chatlain .......................... 354/110 X
3,490,351 1/1970 Cressey .......................... 354/150 X
3,821,760 6/1974 Kennedy et al. .............. 354/150 X

FOREIGN PATENT DOCUMENTS 135824 10/1980 Japan .................................. 354/150

*Primary Examiner*—Donald A. Griffin
*Attorney, Agent, or Firm*—Nilsson, Robbins, Dalgarn, Berliner, Carson & Wurst

[57] ABSTRACT

An apparatus for generating multiple positionally displaced images onto photographic film which includes two mirrors 26, 30 rotatable about axes orthogonal to each other according to preprogrammed instructions whereby the image of an object may be reflected off one mirror onto the other and into the lens of the camera.

10 Claims, 6 Drawing Figures

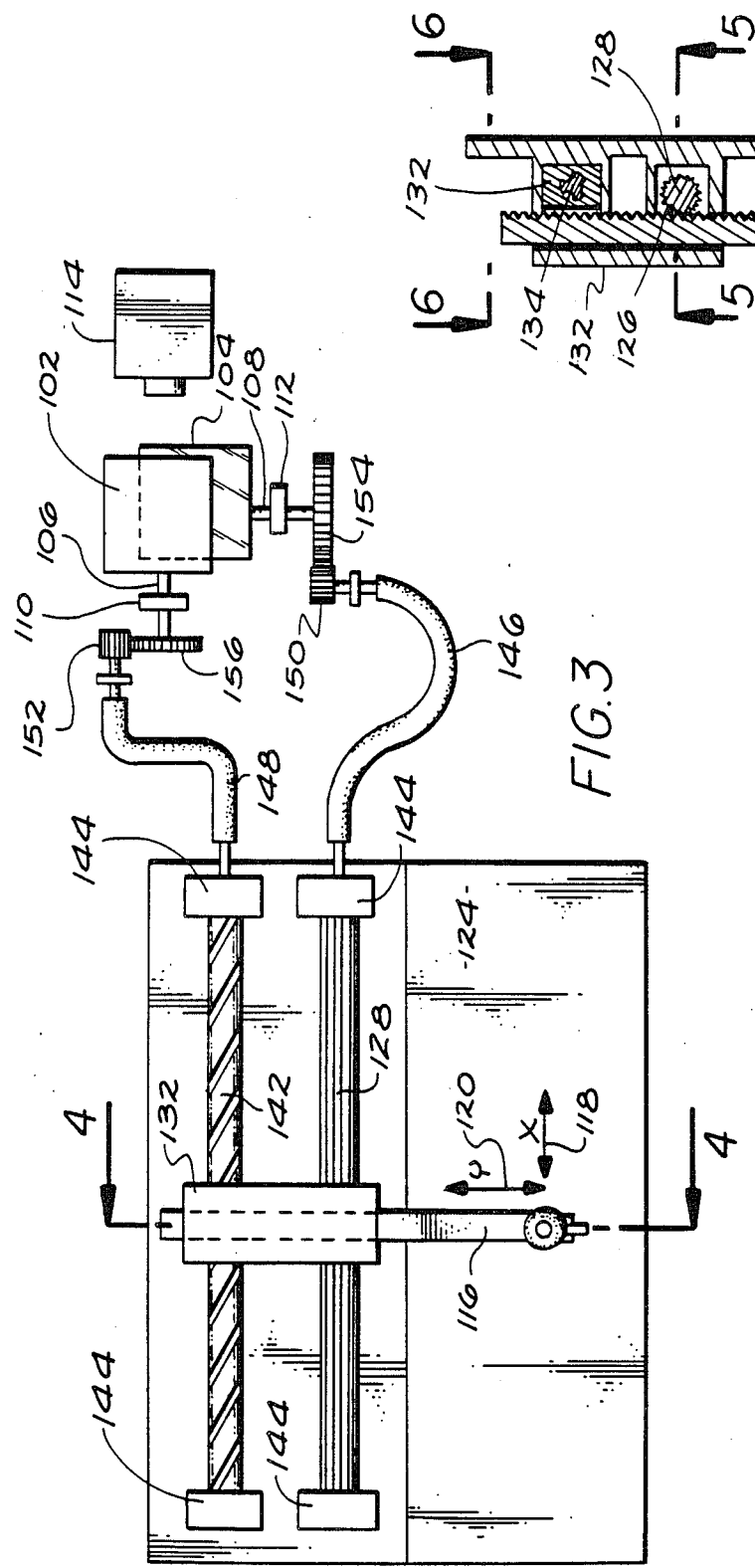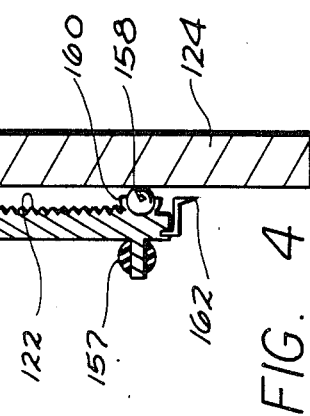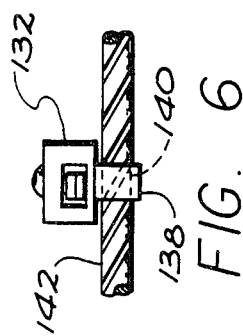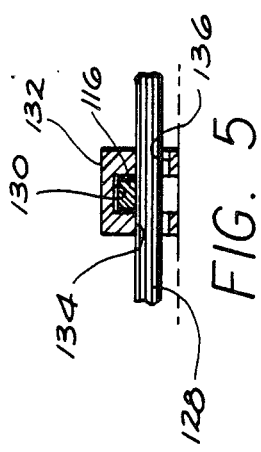

MULTIPLE IMAGE PHOTOGRAPHY SYSTEM

FIELD

The present invention relates to systems for generating photographs of still or moving objects which contain multiple or continuously displaced images of the object being photographed.

BACKGROUND

In the past, photographs containing multiple images of the same object in motion have been produced by either repetitively firing strobe lamps or repeatedly activating a shutter as the object advanced in front of the camera. However, this technique has serious limitations which have resulted in the photographs being unpredictable, usually containing overlapping and poorly aligned images which defeat the artistic and informational content of the photographs. Furthermore, creating movement with a still object on photographic material has involved the actual movement of a camera assembly through the use of a motorized tripod. Because of the masses involved these systems have proven slow and cumbersome to use. Further, in order to produce good results these systems have required a high degree of percision. in positioning the camera which has been difficult to achieve.

The present invention overcomes the foregoing limitations by providing a system which can quickly and accurately move an image with respect to a frame of film and expose different parts of the film to different images of the same object without moving the camera or the object itself.

SUMMARY OF THE INVENTION

The present invention constitutes an apparatus and resultant method for generating multiple and continuously displaced images on photographic or other image recording materials. The apparatus comprises a camera having a lens through which optical images may be focused onto a recording medium such as photographic film, means for adjustably deflecting an optical image of an object to be photographed such as a rotatable mirror, means for adjusting the deflection means such as a servomotor for providing controlled rotary movement and means for effecting the exposure of the recording medium to light from the optical image such as strobe lamps. In operation, the deflection of the optical image of the object being photographed is adjusted and the recording medium is exposed in coordination so that different parts of the medium are exposed to different images or a continuously displaced image of the object being photographed.

In the preferred embodiment, two mirrors rotatable around axes orthogonal to one another are employed along with servomotors for adjusting the angular position of each mirror. The second mirror reflects the optical image of the object to be photographed onto the first mirror which reflects the image into the lens of the camera. The angular adjustment of the second mirror in addition to the first allows any part of the film in any direction to be exposed to the images. The servomotors and mirrors and a set of strobe lamps are controlled by a computer which allows rapid and accurate adjustments in the positions of the mirrors and precise timing of the firing of strobe lamps.

In an alternative embodiment the mirrors are adjusted by means of a completely mechanical system in which the movements of a control arm are translated into rotary motions and angular displacements by the mirrors through the use of gear and cable assemblies.

BRIEF DESCRIPTION OF THE DRAWINGS

FIG. 3 is a top view of an alternative embodiment of the present invention.

FIG. 4 is a cross section of the control arm component of alternative embodiment along line 4—4' in FIG. 3.

FIG. 5 is a cross section of the juncture of the control arm and linear gear components of the alternative embodiment along line 5—5' in FIG. 4.

FIG. 6 is an end view of the juncture of the control arm and spiral gear components of the alternative embodiment along line 6—6' in FIG. 4.

DESCRIPTION OF THE PREFERRED EMBODIMENT

Figure 1:
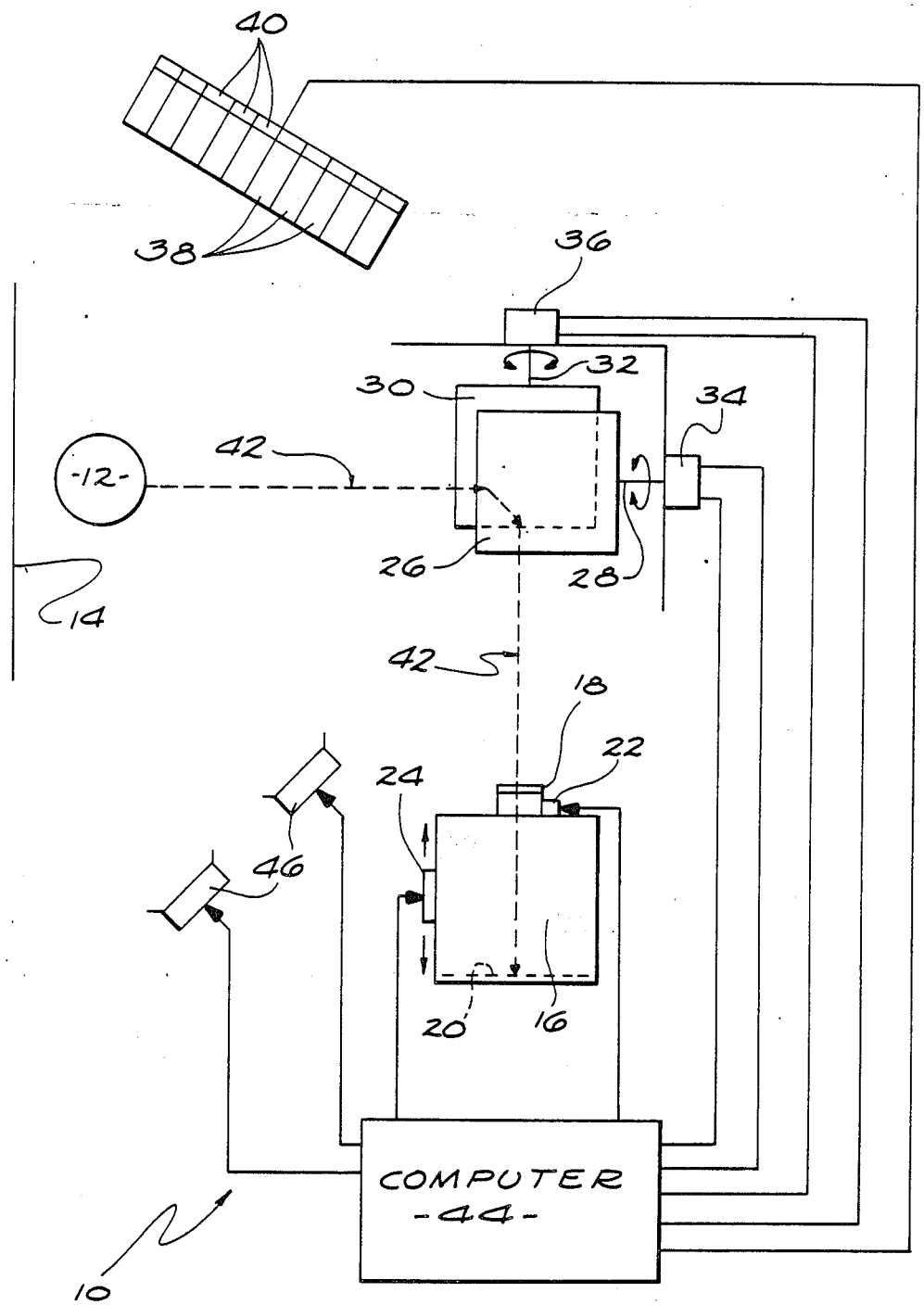
FIG. 1 is a diagrammatic presentation of the major components of the preferred embodiment of the present invention.

Referring to FIG. 1, the present invention is illustrated as the system 10 deployed to make multiple image photographs of the object 12 in front of a non-reflective background screen 14. The system comprises a conventional camera 16 having a lens 18 which allows for the focusing of an optical image onto a frame 20 of photographic film. The camera 16 also includes a shutter 22 operable in response to electrical signals and a means 24 for mechanically adjusting the position of the camera.

The system further includes two rotatable mirrors and means for controlling the angular position of each mirror. The first mirror 26 is rotatable along an axis 28 substantially orthogonal to the optical axis of the lens 18 of the camera and is positioned in front of the camera 16 so as to allow optical images to be reflected off of the mirror and into the lens of the camera. The second mirror 30 is rotatable along an axis 32 substantially parallel to the optical axis of the lens 18 (and orthogonal to the optical axis of the first mirror 26) and is positioned below the first mirror 26 so as to allow optical images of the object 12 being photographed to be reflected onto the first mirror. The rotation and angular position of the mirrors 26 and 30 are controlled by servomotors 34 and 36, respectively, for providing rotary motion and angular displacement in response to electrical signals. The servomotors are preferred to be precision closed-loop galvanometers of the type manufacturered by General Scanning, Inc. or Bulova Systems and Instruments Corp. although other means for accurately controlling rotary position may be used. Further, the system includes a large number of conventional flash lamps 38, such as Sunpak Model 422D strobe lights. It is preferred to employ eighty flash lamps although any number sufficient to provide the necessary intensity and number of illumination events may be used. The flash lamps 38 are connected to sequence boxes 40 which control the firing of the lamps. The sequence boxes 40 comprise conventional switching networks which operate to distribute firing signals to the next available flash lamp so that the flash lamps fire in sequential order. Additionally, the system includes a computer 44 comprising a Z80 central processing unit manufactured by Mostek Corp., a digital to analog converter, a relay output card, and an amplifier card with adjustable damping such as a general purpose controller manufactured by General Scanning or Bulova (modified to handle increased inertia) which receives input via the digital to analog converter. The computer provides the electrical operating signals for the control of the servomotors 34 and 36, the flash lamps 38 and the shutter 22 in accordance with a convention program of instructions for providing a set of coordinated outputs varying in time with respect to prescribed mathematical parameters. The program is written so that the operator may input the exact sequence of mirror positions, flash lamp firings and shutter activity desired for each photograph. The signals for the control of the servomotors 34 and 36 are voltages generated by the digital to analog converter corresponding to desired angular displacements of the mirrors 26 and 30. These voltages are provided to the amplifier card where they are compared with voltages received from the servomotors 34 and 36 which represent the existing angular displacements of the mirrors 26 and 30. The amplifier card then generates an error signal voltage to provide for rotary movements to properly set the angular position of the mirrors 26 and 30. The signals for the control of the flash lamps 38 and shutter 22 are voltage pulses supplied through the relay output card.

In operation, light representing the image of the object to be photographed proceeds along a pathway, including a representative path 42, from the object 12 to mirror 30 where it is, in turn, reflected onto mirror 26 from where it is reflected into lens 18 and focused onto frame 20, whereby the entire optical image of the object to be photographed is simultaneously transposed onto the frame of film. In order to generate a multiple image photograph, the operation of the shutter 22, servomotors 34 and 36 and the flash lamps 38 are coordinated by the computer 44. The shutter 22 is first opened. The angular position of each mirror 36 and 30 is then adjusted by the servomotors 34 and 36 to provide the desired optical pathway from the object to the frame 20 of photographic film and allow for light forming the image of the object to expose the required part of the frame of film. One or more of the flash lamps 38 is then fired to illuminate the object to be photographed. The above steps are then repeated for each image and corresponding part of the frame 20 of the film intended to be exposed. In each repetition, the mirrors 26 and 30 provide the necessary deflection of the optical pathway and the flash lamps 38 provide the necessary light exposure. After the frame 20 is exposed to the intended number of images, the shutter 22 is closed. Additionally, the object to be photographed may be continuously illuminated by tungsten lamps 46 whose intensity may be regulated by the computer 46 in order to create a "tungsten blur" between the images. Further, the necessary exposure of the film may be accomplished by the tungsten lamps alone (without other suitable means of continuous illumination) without the flash lamps. In this manner a a continuously displaced image comprised, in effect, of an infinite number of individual images may be created.

Figure 2:
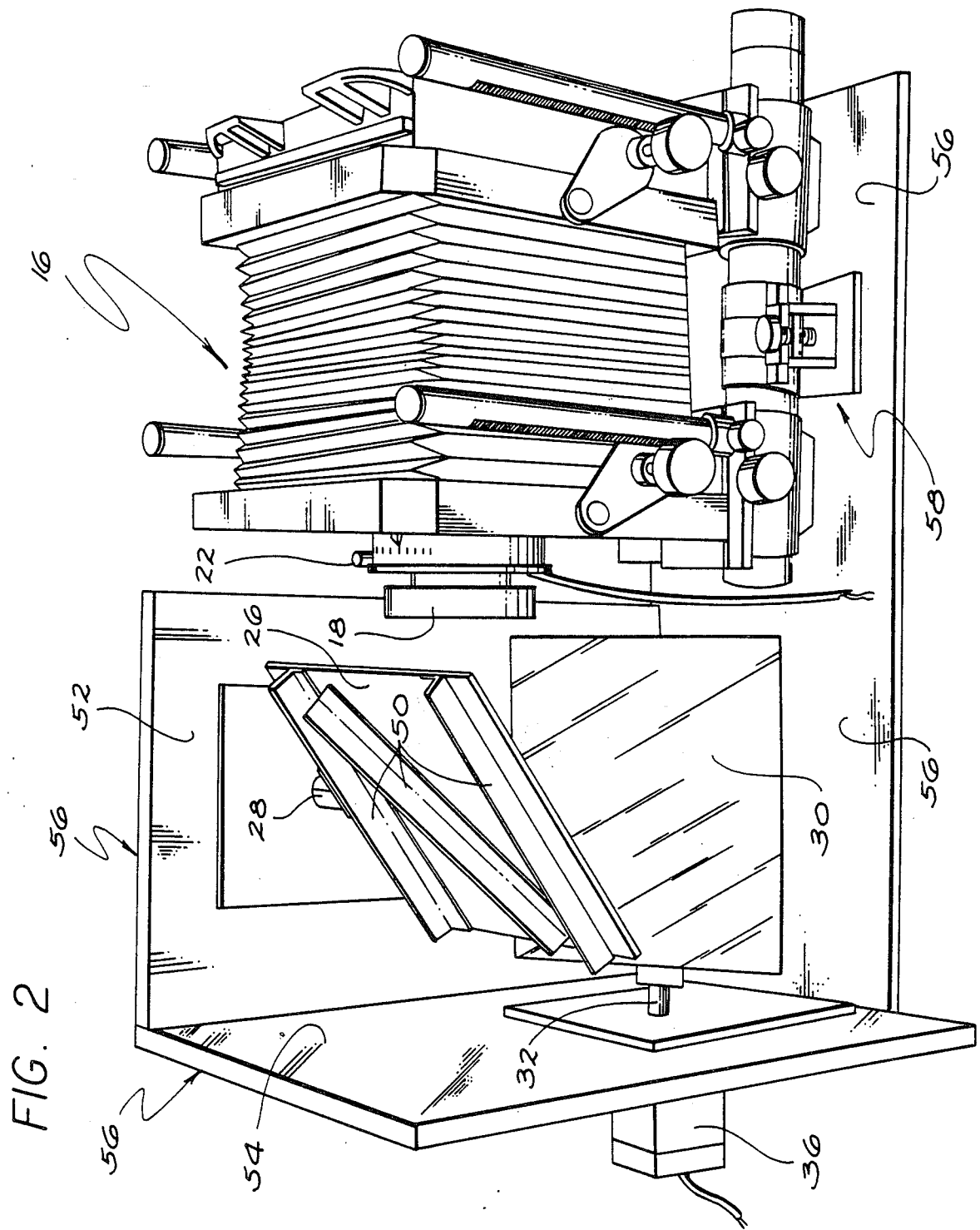
FIG. 2 is a perspective view of the mirror and camera components of the preferred embodiment of the present invention.

Referring now to FIG. 2, the construction and arrangement of the mirrors 26 and 30 and the camera are illustrated in greater detail. Mirrors 26 and 30 comprise front surfaced mirrors with precision optical finishes on their reflective surfaces. The mirrors are backed with lightweight metal stiffeners 50 to help resist distortion, oscillation and breakage. The mirror 26 is positioned directly in front of the lens 18 of the camera 16 so that the center of the mirror is in line with the optical axis of the lens. The mirror 26 is supported by and rotatable around a horizontal axle 38 substantially perpendicular to the optical axis of the lens 18. The mirror 30 is positioned directly below the mirror 26 so that the center of the mirror 26 is above the center of the mirror 30. Mirror 30 is supported and rotatable around a horizontal axle substantially parallel to the optical axis of the lens 18. The axles 28 and 32 are both mounted through the is supported and rotatable around a horizontal axle substantially parallel to the optical axis of the lens 18. The axles 28 and 32 are both mounted through the walls 52 and 54, respectively, of the optical bench 56 and connect therethrough to the servomotors 36 and 34 (not shown in FIG. 2). The optical bench 56 also serves to support the camera 16 which comprises a Toyo-View Model 85 G (4"×5") having a Rodenstock Sironar 180 mm lens 18 with a Graflex No. 3 electronic selenoid operating the shutter 22. The camera 16 includes and is mounted on an adjustable platform 58 which is attached to the bench 56 and allows the position of the camera to be accurately controlled with respect to the mirrors 26 and 30.

FIGS. 3, 4, 5 and 6 illustrate an alternative embodiment of the present invention. Referring now to FIG. 3, the mirrors 102 and 104 are rotable around the axles 106 and 108 which are supported by the bearings 110 and 112. The mirrors operate in similar fashion to the mirrors 26 and 30 of the preferred embodiment by reflecting and transposing entire optical images into the lens of a camera 114 and onto a frame of the film. However, the mirrors 102 and 104 are rotated through the use of a completely mechanical system which translates the movements of arm 116 into rotary movements of the mirrors.

The arm 116 is movable along the surface of the plate 124 in both the x and y directions 118 and 120. As shown in FIG. 4, the knob 157 allows the arm 116 to be easily grasped and manipulated by the operator. The ball 158 rotates in the socket 160 and allows the arm 116 to roll on the surface of the plate 124. The pointer 162 extends down to the surface of plate 124 and allows the position of the arm 116 to be accurately tracked along this surface. The arm 116 has set of gear teeth 122 mounted on its underside which mesh with the teeth 126 of the linear gear shaft 128 and rotate the shaft when the arm is moved in the y direction 120. As shown in FIG. 5, the arm 116 passes through a channel 130 in the slip plate 132 which rides along the shaft 128 on bearings 134 and 136 which allow the shaft to rotate and allow the plate to slide along the shaft in the x direction 118. As shown in FIG. 6, the slip plate 132 is also attached to the block 138 including a hole 140 with teeth on its inside which mesh with the teeth on the spiral gear shaft 142. As the arm 116 is moved in the x direction and the plate 116 slides along the shaft 128, the teeth in the hole 140 force the shaft 142 to rotate. Referring now to FIG. 3, the shafts 128 and 142 are supported by bearings 144 which allow the shafts to rotate freely in accordance with the movements of the arm 116. The shafts 128 and 142 are connected to speedometer type rotating cables 146 and 148, respectively. The cables are connected to the gears 150 and 152 which in turn drive the gears 154 and 156 which are attached to the axles 106 and 108. The pairs of gears 150 and 154 and 152 and 156 operate to reduce the rates and amounts of rotary movement and angular displacement which are transfered to the mirrors 102 and 104 through the axles 106 and 108 and thereby improve the accuracy of the positioning of mirrors in response to movements of the control arm 116.

While the system of the present invention has been described in conjunction with the above embodiments, it should be apparent that changes can be made without departing from the principles of the invention. For example, if it is desired to provide positioning of images in one dimension only, mirrors 26 and 30 could be replaced by a single mirror rotatable around an axis substantially orthogonal to the optical axis of the lens 18 of the camera 16. Also, the flash lamps 38 could be replaced with high intensity flood lamps and multiple image photographs produced by having the computer 44 operate the shutter 22 in coordination with the adjustment of the mirrors 26 and 30 to thereby accomplish the required exposures of the frame 20 of film. Further, the mirrors 26 and 30 may be replaced by other light deflecting means such as highly refractive prisms mounted to be rotatable and to adjustably deflect light into the lens of a camera. Additionally, mirrors 26 and 30 may be diposed so that their axes of rotation are not orthogonal and the computer 44 may be used to make any necessary corrections and achieve proper positioning of image of the object to be photographed on the film. Also, other optical recording media besides photographic film such as video tape or video discs may be utilized to record the multiple or continuously displaced images produced in accordance with the present invention. In such cases the camera 16 may constitute a television camera which may be connected to a special effects generator for recording the multiple or continuously displaced images on a single video frame or any number or sequential video frames. Consequently, the embodiments provided are intended as illustrative only and are not meant to limit the scope of the following claims.

What is claimed is:

1. An apparatus for generating multiple, positionally displaced images on photographic film, comprising:
    a camera having a lens through which optical images may be focused onto a frame of photographic film, the lens defining an optical axis;
    a first mirror rotatable around an axis substantially orthogonal to the optical axis of said lens for adjustably reflecting optical images into said lens;
    means for controlling the angular position of said first mirror in response to control signals;
    a second mirror rotatable around an axis substantially parallel to the optical axis of said lens for adjustably reflecting optical images of an object to be photographed onto said first mirror;
    means for controlling the angular position of said second mirror in response to control signals;
    means for controlling the exposure of the film to the optical images; and
    means for providing operating signals to said means for controlling said first mirror, said means for controlling said second mirror, and said means for controlling exposure in accordance with programmed instructions,
    whereby positionally varying multiple optical images may be projected upon the frame of film and different parts of the film exposed to different images.

2. The apparatus of claim 1, wherein said means for controlling exposure comprises a plurality of flash lamps.

3. The apparatus of claim 1, wherein said camera includes a shutter operable in response to electrical signals and said means for providing signals also provides operating signals to said shutter, whereby further control is provided with respect to the exposure of the film to the multiple images.

4. An apparatus for sequentially altering the location of the optical projection of an image of an object onto a projection surface for generating a sequence of images of the object on the projection surface, each displaced from the others along a selected path across the projection surface, the apparatus comprising:
    an image recording means comprising:
        a lens with an optical axis, the lens positioned for focusing the optical projection of the sequence of images onto the projection surface, and means for storing a representation of the sequence of images projected onto the projection surface;
        a first mirror rotatable about a first axis substantially orthogonal to the optical axis of the lens for selectively altering the location of the image projection on the projection surface along a first dimension of the projection surface;
        a second mirror rotatable about a second axis substantially parallel to the optical axis of the lens for selectively altering the location of the image projection on the projection surface along a second dimension of the projection surface; and
    means for simultaneously changing the angular orientation of the first and second mirrors in accordance with the selected path for directing the projection of each image in the sequence of images onto the projection surface along the selected path, the image recording means storing the projected sequence of images on means for preserving.

5. The apparatus of claim 4 wherein the image recording means comprises a photographic camera and the means for preserving comprises photographic film.

6. The apparatus of claim 4 wherein the image recording means further comprises means for intermittently and repeatedly projecting the image onto the means for preserving for storing multiple replications of the image on the means for preserving.

7. The apparatus of claim 4 wherein the means for simultaneously changing the angular orientation of the first and second mirrors comprises means for continuously rotating the first and second mirrors for moving the projection of the images across the projection surface along the selected path.

8. The apparatus of claim 7 wherein the image recording means further comprises means for intermittently storing the image projected onto the projection surface as the mirrors are continuously moving whereby the sequence of images along the selected path is stored.

9. An apparatus for generating multiple, positionally displaced images on a photographic medium comprising:
    a camera having a shutter operable in response to electrical signals and a lens, defining an optical axis, through which optical images may be focused onto the photographic medium;
    a first mirror rotatable along an axis substantially orthogonal to the optical axis of said lens for adjustably reflecting optical images of objects to be photographed into said lens;

a second mirror rotatable along an axis substantially parallel to the optical axis of said lens for adjustably reflecting optical images of objects to be photographed onto said first mirror;

means for controlling the angular position of said first and second mirrors in response to control signals;

means for providing continuous illumination of the object photographed; and means for providing operating signals to said shutter and said means for controlling said mirror in accordance with programmed instructions, whereby the frame of photographic film may be exposed to positionally varying optical images.

10. An apparatus for generating multiple or continuously displaced images on a photograph film, comprising:

a camera having a lens through which optical images may be focused onto the photographic film, the lens defining an optical axis;

a first mirror rotatable around an axis substantially orthogonal to the optical axis of said lens for adjustably reflecting optical images into said lens;

means for controlling the angular position of said first mirror;

a second mirror rotatable around an axis substantially parallel to the optical axis of said lens for adjustably reflecting optical images of an object to be photographed onto said first mirror;

means for controlling the angular position of said second mirror; and means for exposing the photographic film in accordance with programmed instructions, whereby positionally varying multiple optical images may by projected onto the photographic film for sequentially exposing different parts of the photographic film with the image.

* * * * *